United States Patent [19]

Schub

[11] 4,456,869

[45] Jun. 26, 1984

[54] AUTOMATIC BATTERY CHARGER

[76] Inventor: Leonard Schub, 5606 Melaleuca Dr., Tamarac, Fla. 33319

[21] Appl. No.: 433,654

[22] Filed: Oct. 12, 1982

Related U.S. Application Data

[63] Continuation in part of Ser. No. 317,465, Nov. 2, 1981.

[51] Int. Cl.³ .............................................. H02J 7/04
[52] U.S. Cl. ...................................... 320/38; 307/140
[58] Field of Search ................... 320/2, 11, 19, 21, 27, 320/28, 29, 37, 38; 307/140, 141.4

[56] References Cited

U.S. PATENT DOCUMENTS 3,081,426  3/1963  Bakke ..................................... 320/38
3,467,834  9/1969  Coleman ............................. 307/140
4,255,697  3/1981  Buhler .................................. 320/38

*Primary Examiner*—William M. Shoop
*Assistant Examiner*—Anita M. Ault
*Attorney, Agent, or Firm*—Darby & Darby

[57] ABSTRACT

An automatic battery charging circuit for use with battery powered vehicles such as golf carts includes an automatically timed charging switch which is connected in parallel with the conventional manually timed charging switch of the battery charger. The automatically timed charging switch includes an electrical clock connected across the power line of the charger. When the charger is plugged into the power line, the clock closes the terminals of the automatically timed charging switch for a brief period of time on a periodic basis. This prevents the batteries of the vehicle from becoming substantially discharged during extended periods of non-use, thereby increasing the life of the batteries.

3 Claims, 1 Drawing Figure

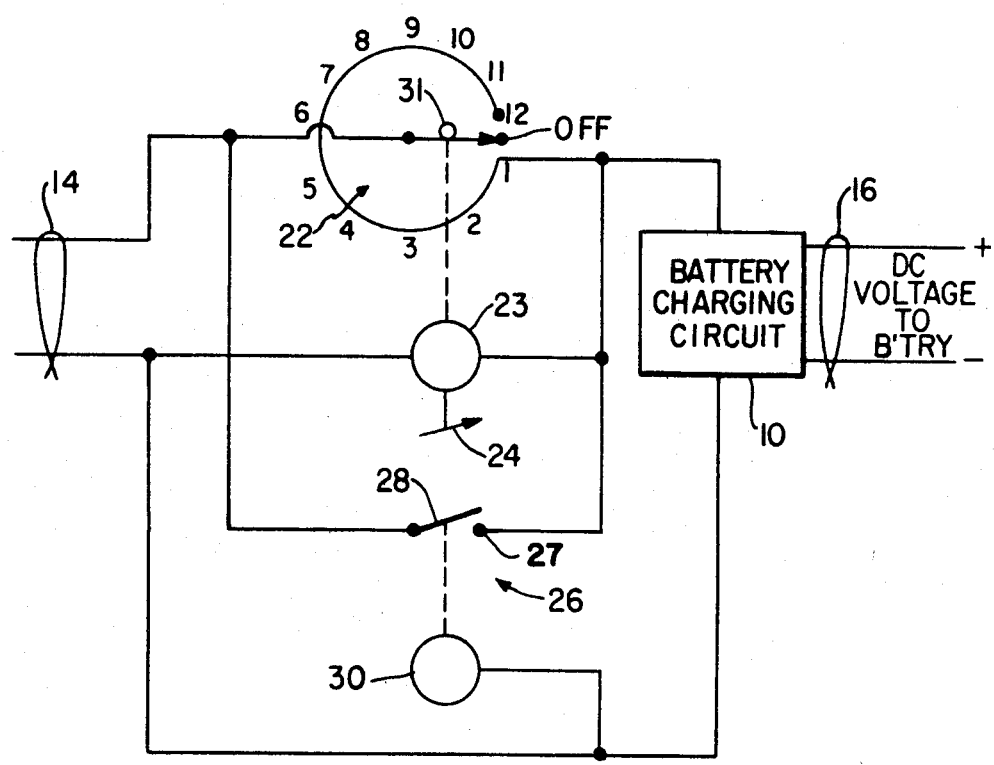

AUTOMATIC BATTERY CHARGER

This is a continuation-in-part of U.S. patent application Ser. No. 317,465 filed on Nov. 2, 1981 in the name of Leonard Schub and entitled Automatic Battery Charger.

This invention relates to battery charging apparatus for use with battery powered vehicles such as golf carts and the like. More particularly, this invention relates to an automatically timed battery charger which will maintain the batteries of a battery powered vehicle in a fully charged condition during long periods of non-use, thereby substantially increasing the life of the batteries.

A variety of battery powered vehicles, such as golf carts, frequently encounter periods of heavy use followed by relatively long periods of inactivity. Typically, each vehicle includes its own charger connected to a power line so that it can be charged each time it is used. In the case of golf carts, the periods between successive recharges can vary greatly, particularly when the carts are not used for weeks or even months.

Desirably, batteries should be maintained in a fully charged condition since the longer they remain partially or totally discharged, the less their ability to maintain a charge. Moreover, batteries which are allowed to remain discharged tend to drop their charge more rapidly after charging when they are unused. On the other hand, it is not advisable to charge continuously the batteries since overcharging causes the formation of excessive gas within the cells of the battery resulting in loss of water and premature breakdown of the cell plate structure.

OBJECTS OF THE INVENTION

The main object of the invention is to provide a battery charging apparatus for use with battery powered golf carts or the like, which will maintain the batteries of the vehicle in a fully charged condition during long periods of inactivity thereby increasing the number of available charge and discharge cycles of the batteries.

Another object of the invention is to provide a battery charging apparatus of the type described which can be readily incorporated into existing battery charging circuits.

THE DRAWINGS

The drawing is a partial schematic circuit diagram showing an automatic battery charging circuit in accordance with the preferred embodiment of the invention.

DETAILED DESCRIPTION

The invention contemplates the use of existing battery charging circuits; therefore, the battery charging circuitry per se is shown in block form at 10. The battery charging circuit 10 may be connected to a source of alternating voltage by a power line 14. As is well-known, battery charging circuit 10 will include suitable full wave rectifier means so as to convert the alternating voltage at its input to a direct voltage at its output terminals 16. The batteries of the vehicle such as a golf cart or the like (not shown in the drawings) may be plugged into the terminals 16 in conventional fashion.

It is customary for a vehicle battery charging apparatus as shown to include a manually-timed charging switch 22 connected in one side of the alternating voltage line. Typically, the switch is controlled by a motor 23 which is operated by a rotatable knob 24. By rotating knob 24 to a desired time (e.g. five hours), the user closes switch 22 thereby activating the battery charging circuit 10 and the motor 23. The motor 23 runs for the desired period of time, at which point the switch 22 is moved to its "off" position and the battery charging circuit 10 and motor 23 are simultaneously deenergized. The switch 22 and electrical motor 23 in combination comprise a commercially available product of well known design and, therefore, are shown only diagramatically.

In accordance with the invention, an automatically timed charging switch 26 is connected in parallel with the manually timed charging switch 22. The automatically timed charging switch includes a stationary terminal 27 and a movable armature 28 which is driven by an electrically controlled clock 30 connected across the power line 14. When the switch 26 is closed by clock 30 (i.e. armature 28 contacts terminal 27), the charging circuit 10 is connected to the power line and the battery will receive a charge.

The switch 26 and clock 30 may comprise a conventional twenty-four hour repeating timer which can be set to close terminals 26 and 28 for selected fifteen minute increments every twenty-four hours. Initially, the timer may be set to close switch 26 for fifteen minutes every twenty-four hour period. Since switches 26 and 22 are in parallel, the battery will be charged when either switch is closed.

When the invention is used with the manual timing switch (including switch 22 and motor 23) as shown in the drawing, the closure of terminals 28 and 27 will energize motor 23, at least in the circuit as shown in the drawing. When that happens, energization of motor 23 will cause the switch 22 to rotate counterclockwise thereby activating the battery charging circuit 10 and the motor 23. The effect of this would be the same as if the user had manually positioned the knob 24 to the "twelve hour" setting and this means that the battery charging circuit 10 would then be energized for twelve hours, or until the motor 23 had returned switch 22 to its "off" position. This, of course, would be undesirable and to avoid this possibility, a mechanical stop 31 is provided to prevent the motor 23 from rotating switch 22 in a counterclockwise direction. Hence, when switch 26 is closed, even though motor 23 is connected across the terminals 14 and thereby energized, the armature 22 is unable to rotate and remains in its "off" position. As a result, when the automatic switch 26 opens, motor 23 is also deenergized and battery charging circuit 10 is disconnected from terminals 14 as desired.

In the case of a golf cart having new batteries (e.g. 6 volt acid batteries), it has been found that a charging cycle of fifteen minutes each day will maintain the batteries in a fully, yet not overcharged, condition. As the batteries grow older and normal deterioration takes place, the automatic timing cycle can be increased gradually so as to increase the charging periods.

A particular benefit of the invention resides in the fact that the automatic switch 26 can be set to apply a charge to the batteries automatically shortly prior to anticipated use of the vehicle. For example, if a golf cart is normally used at 8:00 A.M. each day, the automatic switch 26 could be activated from 7:00 A.M. to 7:30 A.M. Particularly, in the case of older batteries, this would ensure that any self-discharge subsequent to the normal charging cycle would not cause the batteries of the golf cart to discharge until a full round of golf had been completed. Excessive charging of the battery will be prevented by the internal voltage regulating circuitry of the battery charging circuit 10.

Obviously, the structure of the automatically timed charging switch is not a feature of this invention. Likewise the length of the charging periods may be changed to accommodate different circumstances.

What is claimed is:

1. An automatic battery charger for use with battery powered vehicles, comprising a battery charging circuit adapted to be connected to the batteries within the vehicle, said battery charging circuit including means for connecting said circuit to an alternating voltage source, a manually timed charging switch connected between said alternating voltage source and said battery charging circuit for enabling a charge to be applied to said battery for a preselected time interval, and means for maintaining said batteries in a substantially fully charged condition, said means comprising an automatically timed charging switch connected in parallel with said manually timed charging switch, said automatically timed charging switch including an electric clock adapted to be connected across said alternating voltage source for closing the terminals of said automatically timed charging switch for preselected periodic intervals.

2. An automatic battery charger for use with battery powered vehicles according to claim 1, wherein an electric motor drives said manually timed charging switch, closure of either said manually timed charging switch or said automatically timed charging switch energizing said electric motor, and wherein there is further provided means for preventing said battery charging circuit from being energized by closure of said automatically timed charging switch for a period of time longer than the period during which said automatically timed charging switch is closed.

3. An automatic battery charger according to claim 2, wherein said last named means comprises a stop member for preventing said electric motor from closing said manually timed charging switch when said automatically timed charging switch is closed.

* * * * *